United States Patent
Shirai

(10) Patent No.: US 8,355,058 B2
(45) Date of Patent: Jan. 15, 2013

(54) IMAGE PICKUP APPARATUS CAPABLE OF CORRECTING IMAGE QUALITY DEGRADATION DUE TO OPTICAL MEMBER, METHOD OF CONTROLLING IMAGE PICKUP APPARATUS, AND NONVOLATILE STORAGE MEDIUM

(75) Inventor: Kunihiro Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 12/955,460

(22) Filed: Nov. 29, 2010

(65) Prior Publication Data
US 2011/0128406 A1 Jun. 2, 2011

(30) Foreign Application Priority Data

Nov. 30, 2009 (JP) ................. 2009-271909
Nov. 19, 2010 (JP) ................. 2010-259087

(51) Int. Cl.
*H04N 9/73* (2006.01)
*H04N 5/225* (2006.01)
*G02B 13/16* (2006.01)

(52) U.S. Cl. .............. 348/223.1; 348/335; 348/222.1
(58) Field of Classification Search ............... 348/222.1, 348/223.1, 251, 340, 335
See application file for complete search history.

(56) References Cited

U.S. PATENT DOCUMENTS

| 7,920,200 | B2 * | 4/2011 | Azuma | 348/335 |
| 8,189,066 | B2 * | 5/2012 | Oota | 348/222.1 |
| 2001/0014180 | A1 * | 8/2001 | Ejiri et al. | 382/275 |
| 2002/0041383 | A1 * | 4/2002 | Lewis et al. | 358/1.9 |
| 2005/0213159 | A1 * | 9/2005 | Okada et al. | 358/3.26 |
| 2007/0211154 | A1 * | 9/2007 | Mahmoud et al. | 348/251 |
| 2008/0007630 | A1 * | 1/2008 | Hara | 348/223.1 |
| 2009/0009633 | A1 * | 1/2009 | Suto | 348/241 |
| 2009/0262231 | A1 * | 10/2009 | Murata et al. | 348/335 |
| 2010/0134643 | A1 * | 6/2010 | Koishi | 348/222.1 |
| 2010/0214433 | A1 * | 8/2010 | Takahashi | 348/223.1 |

FOREIGN PATENT DOCUMENTS

| JP | 2000-003437 | 1/2000 |
| JP | 2003-110936 | 4/2003 |
| JP | 2008-096907 | 4/2008 |
| JP | 2006-121384 | 5/2008 |

* cited by examiner

*Primary Examiner* — Nhan T Tran
*Assistant Examiner* — Tuan Le
(74) *Attorney, Agent, or Firm* — Cowan, Liebowitz & Latman, P.C.

(57) ABSTRACT

An image pickup apparatus capable of forming a corrected image which does not give a feeling of wrongness to a user. In the apparatus, an image pickup element photoelectrically converts an optical image to output the same as image data. A target correction value is calculated for correcting image quality degradation due to a lens unit, based on lens characteristic information and a status of the lens unit. A system controller sets a rate of change to stepwise make the current correction value closer to the target correction value, and repeatedly calculates the correction value according to the target correction value and the rate of change. The image data is corrected based on the repeatedly calculated correction value. The rate of change is changed depending on the relationship between a preceding value of the correction value calculated in the past and the target correction value.

7 Claims, 6 Drawing Sheets

*FIG.2A* *FIG.2B* *FIG.2C*
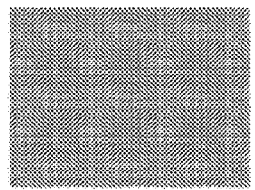 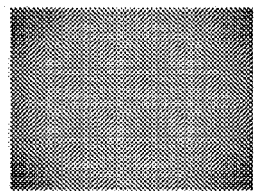 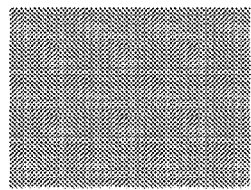
(1) (1) (1)
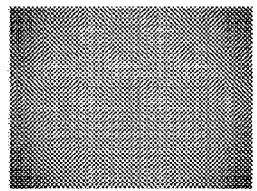 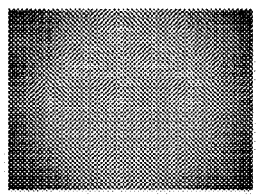 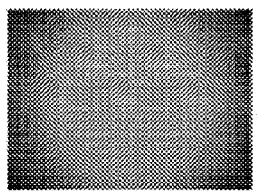
(2) (2) (2)

*FIG.3A*  *FIG.3B*  *FIG.3C*
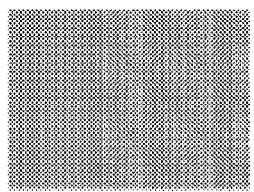
(1)
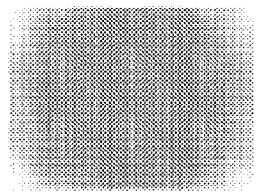
(1)
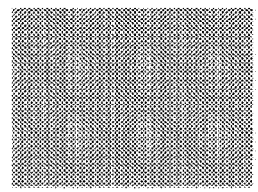
(1)
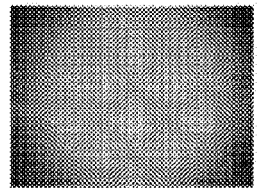
(2)
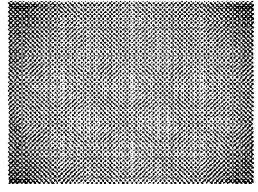
(2)
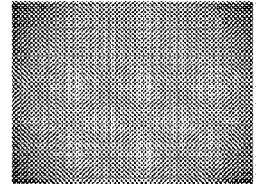
(2)

IMAGE PICKUP APPARATUS CAPABLE OF CORRECTING IMAGE QUALITY DEGRADATION DUE TO OPTICAL MEMBER, METHOD OF CONTROLLING IMAGE PICKUP APPARATUS, AND NONVOLATILE STORAGE MEDIUM

BACKGROUND OF THE INVENTION

1. Field of the Invention

The present invention relates to an image pickup apparatus, such as a digital camera or a video camcorder (video camera recorder), a method of controlling the image pickup apparatus, and a computer-readable nonvolatile storage medium storing a computer-executable program implementing the method, and more particularly to signal processing for correcting image quality degradation due to a lens unit.

2. Description of the Related Art

A lens unit for forming an object image on an image pickup element involves various factors which cause image degradation, such as distortion, blur, or peripheral light amount drop, on the object image.

For example, magnification chromatic aberration which blurs the peripheral color of an image is caused when red, green, and blue lights having passed through the lens unit form images at respective different locations in a direction orthogonal to the optical axis according to the respective wavelengths of the color lights. A peripheral light amount drop as a phenomenon that the amount of light becomes smaller toward the periphery of an image than in the central portion of the image is caused e.g. by so-called vignetting which occurs due to mechanical vignetting by the barrels of the lens unit or the cosine fourth law.

For example, the magnification chromatic aberration as one of the image quality degradations due to a lens unit can be reduced to some extent by using a combination of a plurality of lenses having complicated shapes or by using fluorite which rarely causes chromatic dispersion, as a lens material. The peripheral light amount drop can also be reduced to some extent by using a lens having a large image circle. In either of the above-mentioned cases, however, it is impossible to fully prevent image quality degradation.

To solve this problem, there have been proposed techniques in which image quality degradation due to the characteristics of a lens unit is reduced by image correction performed by signal processing.

For example, a technique has been disclosed in which correction data on peripheral light amount drops are stored in a ROM in association with aperture values, focal lengths, or shooting distances of a lens unit, and a digital signal processor corrects an image by carrying out signal processing according to an actual aperture value, actual focal length, or actual shooting distance of the lens unit (see Japanese Patent Laid-Open Publication No. 2003-110936).

Further, there has been disclosed another technique in which image quality degradation due to lens aberration is corrected by signal processing based on aberration information on a lens unit, object luminance data, and color difference data (see Japanese Patent Laid-Open Publication No. 2000-3437).

The above-mentioned techniques of correcting image quality degradation due to a lens unit by carrying out signal processing are applied not only to digital cameras, but also to digital video camcorders and cameras equipped with a so-called live view (LV) function for displaying images picked up by an image pickup element, on a real-time basis. In other words, image quality degradation of a moving image due to a lens unit is corrected in real time according to the optical state of the lens unit.

For example, a technique has been disclosed in which correction values for use in correcting aberration, the amount of peripheral light, and so forth are stored in advance in a memory within an interchangeable lens unit, and when the power of an image pickup apparatus is turned on or when the interchangeable lens unit is connected to the image pickup apparatus, the information of the correction values is sent from the memory within the interchangeable lens unit to the image pickup apparatus in advance. Then, while receiving information on the optical state of the interchangeable lens unit in real time, the image pickup apparatus performs image correction using corresponding ones of the correction values received in advance according to the optical state of the interchangeable lens unit (see Japanese Patent Laid-Open Publication No. 2008-96907).

However, a correction value for use in correction of a peripheral light amount drop varies according to the aperture value and the focus position even in a single lens unit. Further, in a lens unit having a zoom mechanism, the correction value varies according to the focal length as well. Therefore, as the lens unit has more optical statuses, the number of correction values for correction of peripheral light amount drops becomes enormous, which not only makes it necessary to provide a larger memory area necessitated, but also takes longer communication time for data reception.

To solve this problem, there has been disclosed a technique in which a peripheral light amount drop correction value is not provided for each zoom position, each aperture value, or each focus position, but a correction value corresponding to the current zoom position, the current aperture value, or the current focus position is calculated by determining and interpolating from discrete correction values (see Japanese Patent Laid-Open Publication No. 2006-121384).

When an image pickup apparatus grasps an optical status of the lens unit and then starts calculating a correction value suitable for the optical status of the lens unit, correction is delayed at least by the time taken for the calculation of the correction value. During "delay" the time period, a correction value obtained in the immediately preceding loop is used for correction of image quality degradation. As a consequence, e.g. in the correction of a peripheral light amount drop, an insufficiently corrected state can occur in which luminance on the periphery of an image is reduced due to the use of the correction value obtained in the immediately preceding loop, because the correction value is smaller than an appropriate value. Otherwise, an overcorrected state can occur in which luminance on the periphery of an image is increased because the correction value is larger than an appropriate value. As long as the optical state of the lens unit is being changed, the way an object image looks also changes, and hence insufficient correction or overcorrection is not conspicuous on the image, but immediately after the changing of the optical state of the lens unit is stopped, the insufficient correction or overcorrection becomes conspicuous.

To make the correction delay time during which the correction is delayed as short as possible, it can be envisaged that immediately after calculation of a new correction value is completed, the image is corrected using the new correction value. Assuming, by way of example, that an image is insufficiently corrected due to correction delay, when the insufficiently corrected image is changed to an appropriately corrected image, the periphery of the image, which appeared dark to a user, comes to look bright. At this time, if the amount of change in the optical state of the lens unit is large, the amount of increase in the luminance level of the periphery of the image also becomes large, making the change in the luminance level conspicuous. As a consequence, the user perceives the change as flickering of the image, and hence is given a feeling of wrongness.

To solve this problem, a method can be envisaged in which even after the completion of calculation of a new correction value, the original correction value is gradually shifted to the new correction value instead of correcting an image using the new correction value immediately. However, assuming that an image is overcorrected due to correction delay, the image cannot be promptly corrected from the overcorrection state even though the calculation of a new correction value is completed. Since an overcorrected image is more conspicuous than an insufficiently corrected image, if the overcorrection state of the image is maintained or left uncorrected, the user is given a feeling of wrongness.

A similar problem occurs in correction of a distortion aberration or a chromatic aberration. For example, in distortion aberration correction, which is performed to correct distortion of the whole shape of an image, an area of the image which existed before the correction is excluded from the image having undergone the distortion aberration correction. For this reason, the range of an object included in an image differs depending on the amount of distortion aberration correction. Therefore, when the amount of distortion aberration correction changes sharply, a change in the object range included in the angle of view becomes conspicuous, which gives a feeling of wrongness to a user. Further, when overcorrection occurs in the distortion aberration correction, the image is distorted into a more unnatural shape, and when this unnaturally distorted state of the image is maintained or left uncorrected, the user is given a feeling of wrongness.

SUMMARY OF THE INVENTION

The present invention provides an arrangement which makes it possible to obtain a corrected image which makes a change in the optical state of a lens unit difficult to give a feeling of wrongness to a user (so reduces the chances of a change in state of an optical unit leading to a corrected image which feels wrong to a user).

In a first aspect of the present invention, there is provided a image pickup apparatus comprising an image pickup unit configured to photoelectrically convert an optical image of an object, the optical image having passed through an optical member, to thereby output the optical image as image data, an acquisition unit configured to acquire a status of the optical member, a first calculation unit configured to calculate a first correction value for correcting image quality degradation due to characteristics of the optical member, based on characteristic information on the optical member and the status of the optical member acquired by the acquisition unit, a second calculation unit configured to set a rate of change at which a second correction value is made closer to the first correction value, and to repeatedly calculate the second correction value according to the first correction value and the rate of change, and a correction unit configured to correct the image data based on the second correction value calculated by the second calculation unit, wherein the second calculation unit is configured to set the rate of change independence upon a relationship between a preceding value of the second correction value calculated in the past and the first correction value.

In a second aspect of the present invention, there is provided a method of controlling an image pickup apparatus provided with an image pickup unit configured to photoelectrically convert an optical image of an object, the optical image having passed through an optical member, to thereby output the optical image as image data, comprising acquiring a status of the optical member, calculating a first correction value for correcting image quality degradation due to characteristics of the optical member, based on characteristic information on the optical member and the status of the acquired optical member, setting a rate of change at which a second correction value is made closer to the first correction value, and repeatedly calculating the second correction value according to the first correction value and the rate of change, and correcting the image data based on the second correction value, wherein the rate of change is set independence upon a relationship between a preceding value of the second correction value calculated in the past and the first correction value.

In a third aspect of the present invention, there is provided a computer-readable nonvolatile storage medium storing a computer-executable program for causing a computer to execute a method of controlling an image pickup apparatus provided with an image pickup unit configured to photoelectrically convert an optical image of an object, the optical image having passed through an optical member, to thereby output the optical image as image data, comprising acquiring a status of the optical member, calculating a first correction value for correcting image quality degradation due to characteristics of the optical member, based on characteristic information on the optical member and the status of the acquired optical member, setting a rate of change at which a second correction value is made closer to the first correction value, and repeatedly calculating the second correction value according to the first correction value and the rate of change, and correcting the image data based on the second correction value, wherein the rate of change is set independence upon a relationship between a preceding value of the second correction value calculated in the past and the first correction value.

According to the present invention, it is possible to obtain a corrected image which makes a change in the optical state of a lens unit difficult to give a feeling of wrongness to a user (so makes it possible to obtain a corrected image, even when there is a change in state of an optical unit, with a reduced chance of the corrected image feeling wrong to a user).

The features and advantages of the invention will become more apparent from the following detailed description taken in conjunction with the accompanying drawings.

BRIEF DESCRIPTION OF THE DRAWINGS

FIGS. 2A to 2C are views useful in explaining an example of correction of a peripheral light amount drop which occurs when a zoom position of a lens unit is changed from a telephoto side to a wide-angle side with an aperture wide open.

FIGS. 3A to 3C are views useful in explaining an example of correction of a peripheral light amount drop which occurs when the zoom position of the lens unit is changed from the wide-angle side to the telephoto side with the aperture wide open.

DETAILED DESCRIPTION OF THE EMBODIMENTS

The present invention will now be described in detail below with reference to the accompanying drawings showing embodiments thereof.

Figure 1:
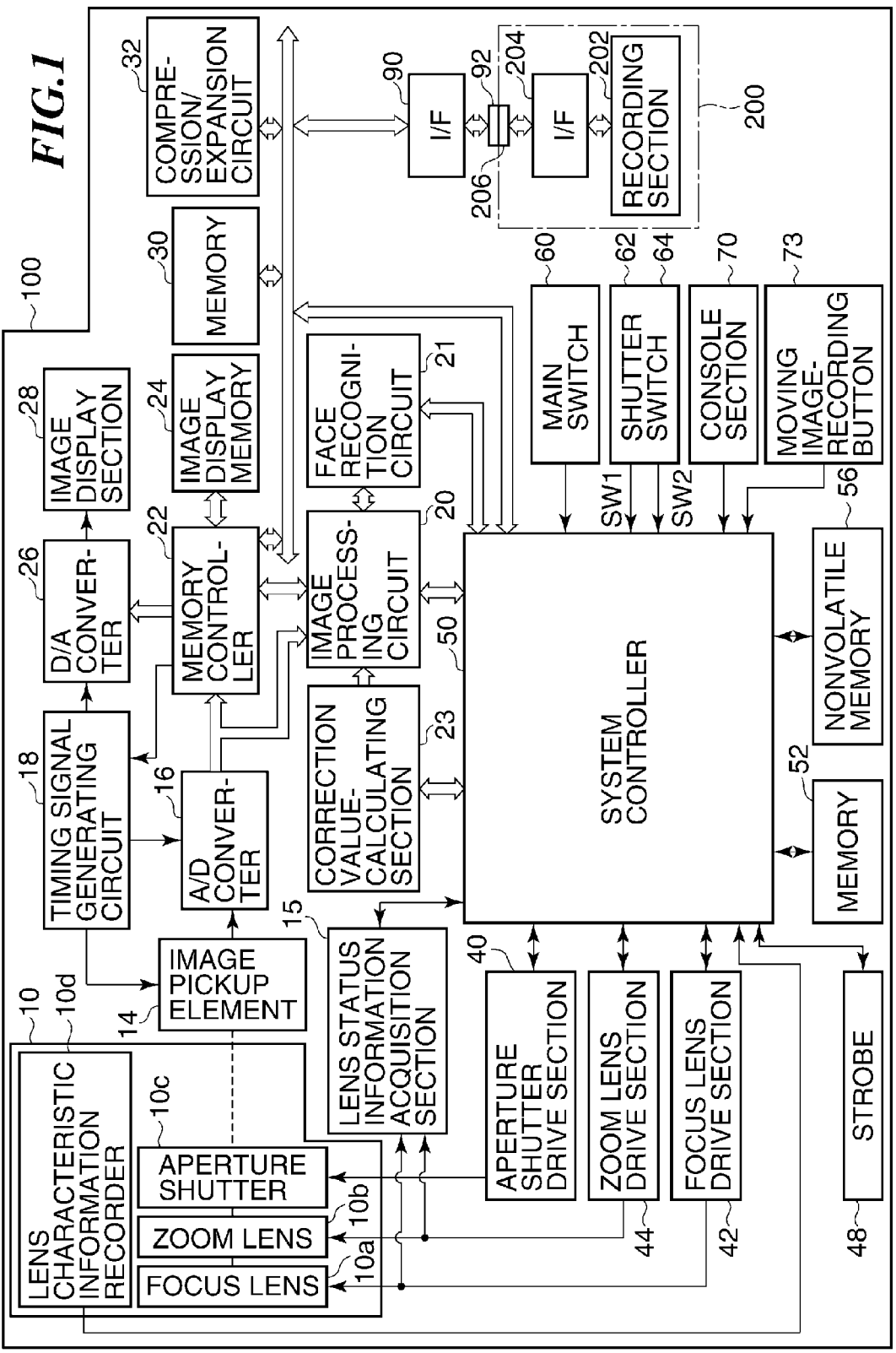
FIG. 1 is a schematic block diagram of an image pickup apparatus according to a first embodiment of the present invention.

FIG. 1 is a schematic block diagram of an image pickup apparatus according to a first embodiment of the present invention.

As shown in FIG. 1, the image pickup apparatus 100 includes a lens unit 10, as an optical member, which comprises a focus lens 10a, a zoom lens 10b, an aperture shutter 10c, and a lens characteristic information recorder 10d. The lens characteristic information recorder 10d records information including a lens ID, lens focal lengths, discrete correction values, and so forth.

The data recorded in the lens characteristic information recorder 10d includes data for use in correcting, by signal processing, various image quality degradations due to the lens unit 10, such as a peripheral light amount drop, chromatic aberration, shading, spherical aberration, distortion aberration.

An optical image having passed through the focus lens 10a and the zoom lens 10b enters an image pickup element 14 when the aperture shutter 10c is opened. The image pickup element 14 photoelectrically converts the optical image and outputs the same as an analog image signal. An A/D converter 16 converts the analog image signal output from the image pickup element 14 to digital image data.

A timing signal generating circuit 18 supplies a clock signal, a control signal, and the like to the image pickup element 14, the A/D converter 16, and a D/A converter 26 under the control of a memory controller 22 and a system controller 50.

An image processing circuit 20 carries out predetermined image processes, such as a pixel interpolation process and a color conversion process, on the image data delivered from the A/D converter 16 or image data delivered from the memory controller 22. Further, the image processing circuit 20 carries out a predetermined calculation process using the image data delivered from the A/D converter 16. Based on results of the predetermined calculation process, the system controller 50 carries out an automatic exposure control process and an autofocus process, based on a TTL (through-the-lens) method, for controlling an aperture shutter drive section 40 and a focus lens drive section 42, and an automatic emission control process for a strobe 48.

Further, the image processing circuit 20 carries out a predetermined calculation process using the image data delivered from the A/D converter 16, and also carries out an automatic white balance process by the TTL method, based on the results of the predetermined calculation process.

A face recognition circuit 21 recognizes (detects) a human image, particularly a human face, in an object image, and sends the results of the detection to the system controller 50.

The system controller 50 controls the focus lens drive section 42 so as to bring a face portion into focus based on the result of the face detection by the face recognition circuit 21, and adjusts the amount of light to be emitted from the strobe 48. Further, the system controller 50 causes the image processing circuit 20 to carry out the automatic white balance process according to the result of the face detection by the face recognition circuit 21.

The memory controller 22 controls the A/D converter 16, the timing signal generating circuit 18, the image processing circuit 20, an image display memory 24, the D/A converter 26, a memory 30, and a compression/expansion circuit 32. The image data output from the A/D converter 16 is written into the image display memory 24 or the memory 30 via the image processing circuit 20 and the memory controller 22, or only via the memory control circuit 22.

The memory 30 is used as a frame buffer for images continuously written into a recording medium, not shown, of a recording medium drive 200 at a predetermined rate during video shooting. The memory 30 is also used as a work area by the system controller 50. The compression/expansion circuit 32 reads image data stored in the memory 30 to carry out compression processing or expansion processing thereon, and writes the processed image data into the memory 30 again.

The aperture shutter drive section 40 drives the aperture shutter 10c based on the results of the calculation by the image processing circuit 20 to control the aperture and shutter speed. The focus lens drive section 42 drives the focus lens 10a based on the results of the calculation by the image processing circuit 20 to carry out autofocus control. A zoom lens drive section 44 drives the zoom lens 10b according to a magnification operation by an console section 70. The strobe 48 has functions of throwing autofocus auxiliary light and controlling strobe light.

The system controller 50 includes a CPU, not shown, and a memory, not shown, and controls the overall operation of the image pickup apparatus 100. A memory 52 stores constants and variables, computer programs (basic programs), and so forth for operations of the system controller 50.

A nonvolatile memory 56 is implemented e.g. by an EEPROM which is capable of electrically deleting/recording data, and is used as a memory for storing computer programs or the like. The computer programs stored in the nonvolatile memory 56 includes an application program for causing the system controller 50 to execute a peripheral light amount correction process, described hereinafter with reference to FIG. 4. Further, the nonvolatile memory 56 stores settings and the like configured on GUI (Graphical User Interface) screens, such as a menu screen and an exposure correction/AEB (Auto Exposure Bracketing) configuration screen.

A main switch 60 switches on and off of the power of the image pickup apparatus 100. Further, it is possible to switch on and off the power of the recording medium drive 200 connected to the image pickup apparatus 100 by the operation of the main switch 60 at the same time.

A shutter switch (SW1) 62 is turned on by a first stroke operation (half pressing) of a release button, and instructs the system controller 50 to start operations for the autofocus process, the automatic exposure control process and the like. A shutter switch (SW2) 64 is turned on by a second stroke (full pressing) of the release button, and instructs the system controller 50 to start operations of a series of image pickup processing comprising exposure processing, development processing, and the recording processing.

The console section 70 includes various buttons and switches, and a touch panel, none of which is shown. The buttons include a menu button, a set button, a menu moving button, a compression mode switch, etc, for example. The system controller 50 performs various operations according to signals from the console section 70.

It should be noted that the compression mode switch is used to select a compression ratio of JPEG compression or select a CCDRAW mode in which a signal from the image pickup element 14 is digitized and recorded in the recording medium of the recording medium drive 200 without compression.

A mode for JPEG compression can be switched e.g. between a normal mode and a fine mode. The normal mode is selected when importance is attached to the data size of a picked-up image, and the fine mode is selected when importance is attached to the image quality of a picked-up image.

In the JPEG compression mode, image data is read out which was read from the image pickup element 14 and written into the memory 30 via the A/D converter 16, the image processing circuit 20, and the memory controller 22. Then, the image data is compressed by the compression/expansion circuit 32 at a set compression ratio and is recorded in the recording medium of the recording medium drive 200.

In the CCDRAW mode, image data is read out which was read out on a line-by-line basis according to the pixel array of Bayer pattern color filters of the image pickup element 14 and was written into the memory 30 via the A/D converter 1 and the memory controller 22, and is recorded in the recording medium of the recording medium drive 200. A moving image-recording button 73 is operated to give an instruction for recording picked-up moving image data in the memory 30 or the recording medium of the recording medium drive 200.

An interface (I/F) 90 provides interface with the recording medium drive 200, and a connector 92 provides connection to the same. The recording medium drive 200 comprises an interface (I/F) 204 and a recording section 202. The recording medium drive 200 is removably connected to the image pickup apparatus 100 via a connector 206, and records and stores moving image data and still image data picked up by the image pickup apparatus 100 in the recording medium thereof. In a case where moving image data or still image data is recorded and stored in the recording medium of the recording medium drive 200, it is possible to perform image correction so as to suppress image quality degradation due to the characteristics of the lens unit 10.

An image display section 28 displays image data written in the image display memory 24, which are sequentially converted to an analog signal using the D/A converter 26, thereby realizing an electronic viewfinder (EVF) function, that is, a so-called live view (LV) function.

It should be noted that the image display section 28 turns on or off the electronic viewfinder (EVF) function in response to an instruction from the system controller 50. When the live view (LV) function is turned on, it is possible to perform the image correction to suppress image quality degradation due to the characteristics of the lens unit 10.

In this image correction, when the power is turned on or when an interchangeable lens (lens unit 10) is connected to the image pickup apparatus, the system controller 50 reads characteristic information on the lens unit 10 from the lens characteristic information recorder 10d.

This lens characteristic information contains characteristic information, including an ID, a wide open aperture value, and telephoto-end and wide-angle end focal lengths, of the lens unit 10 as partially mentioned hereinbefore.

A lens status information acquisition section 15 acquires the current status of the lens unit 10 in predetermined timing, e.g. on a frame-by-frame basis.

Specifically, the lens status information acquisition section 15 acquires the current aperture value from the aperture shutter drive section 40, the current focal length (zoom position) from the zoom lens drive section 44, and the current focal position from the focus lens drive section 42. It is to be understood that other lens statuses necessary for image correction can be acquired as required.

The system controller 50 sends the lens characteristic information acquired from the lens characteristic information recorder 10d and the lens status information acquired from the lens status information acquisition section 15 to a correction value-calculating section 23.

The correction value-calculating section 23 calculates various correction values, such as a correction coefficient for use in correcting a peripheral light amount drop due to the lens unit 10, a correction coefficient for use in correcting a distortion aberration due to the lens unit 10, and a correction coefficient for use in correcting a chromatic aberration due to the lens unit 10, based on the received lens characteristic information and lens status information.

The correction values may be calculated based on correction values calculated in advance from the lens status information and the lens characteristic information and stored, or alternatively, using approximated values derived from general optical equations, based on the lens status information and the lens characteristic information.

The system controller 50 recalculates, using an application rate and the like, described hereinafter, the correction values calculated by the correction value-calculating section 23, and sends the recalculated correction values to the image processing circuit 20. The image processing circuit 20 corrects a plurality of types of image degradations due to the characteristics of the lens unit 10, based on the received correction values.

In some case, it takes a relatively long time to calculate a correction value by the correction value-calculating section 23, as described hereinabove, so that image correction cannot be performed in real time depending on time required for the calculation processing.

In this case, for example, a method can be envisaged in which a correction value is calculated once per several frames and image correction processing is executed in delayed timing. However, when image correction processing is executed in delayed timing, the appearance of an image after the correction can be degraded. For example, when a correction value related to a peripheral light amount drop is calculated once per several frames as mentioned above, there arise problems described below.

FIGS. 2A to 2C show a case where the zoom position of the lens unit 10 has been changed from the telephoto side to the wide-angle side with the aperture wide open.

A view (2) of FIG. 2A shows the amount of light that enters the image pickup element 14 when an image of a uniform luminance surface is picked up with the lens unit 10 positioned on the telephoto side and with the aperture wide open. As is apparent from the view (2) of FIG. 2A, the light amount decreases toward the periphery of the image. A view (1) of FIG. 2A shows an image having a uniform luminance, which is obtained by correcting a peripheral light amount drop of the image shown in the view (2) of FIG. 2A.

When the zoom position of the lens unit 10 is changed to the wide-angle side in this state, the focal length becomes shorter. As a consequence, as for the amount of light that enters the image pickup element 14, a light amount on the periphery of the image is further reduced e.g. by the cosine fourth law than when the zoom position of the lens unit 10 is on the telephoto side, and a state shown in a view (2) of FIG. 2B appears.

At this time, it is difficult to correct the peripheral light amount drop in real time for the above-described reason, and hence a correction value used to obtain the image shown in the view (1) of FIG. 2A has to be used temporarily. As a consequence, the corrected image is output in a state where the peripheral light amount drop is not fully corrected as shown in a view (1) of FIG. 2B. To solve this problem, a correction value is recalculated based on information that the state of the lens unit 10 has been changed, and the peripheral light amount drop is corrected using the correction value obtained anew, whereby an image having the peripheral light amount drop properly corrected as shown in a view (1) of FIG. 2C can be obtained.

In this case, switching from the view (1) of FIG. 2B to the view (1) of FIG. 2C has a time lag from a time point the user actually changed the focal length. For this reason, a sudden change in the peripheral luminance occurring when the user is not operating the image pickup element 14 is recognized by the user as flickering on the screen.

Assuming that in the above-described example, a view (2) of FIG. 2C shows the amount of light that enters the image pickup element 14 when the image in the view (1) of FIG. 2C is obtained, the optical state of the lens unit 10 in the view (2) of FIG. 2B is the same as that in the view (2) of FIG. 2C.

If the zoom position of the lens unit 10 corresponding to the view (2) of FIG. 2C has been changed further toward the wide-angle end than that corresponding to the view (2) of FIG. 2B, the peripheral light amount drop in the image shown in the view (1) of FIG. 2C has not been fully corrected, either. As long as the zoom position of the lens unit 10 is continuously changed toward the wide-angle end, this state repeatedly appears, and after the zoom position is completely changed (so once the adjustment of the zoom position of the lens unit has been completed), an image having the peripheral light amount drop properly corrected is obtained. However, the angle of view for shooting is also changing while the zoom position of the lens unit 10 is being changed toward the wide-angle end, so the peripheral light amount drop is not so conspicuous. Therefore, the problem is screen flickering which occurs after the zoom position is completely changed (so once the adjustment of the zoom position of the lens unit has been completed) rather than screen flickering which occurs while the zoom position is being changed.

FIGS. 3A to 3C show a case where the zoom position of the lens unit 10 is changed from the wide-angle side to the telephoto side with the aperture wide open.

A view (2) of FIG. 3A shows the amount of light that enters the image pickup element 14 when an image of a uniform luminance surface is picked up with the lens unit 10 positioned on the wide-angle side and with the aperture wide open. As is apparent from the view (2) of FIG. 3A, the light amount decreases toward the periphery of the image. A view (1) of FIG. 3A shows an image having a uniform luminance, which is obtained by correcting a peripheral light amount drop of the image shown in the view (2) of FIG. 3A.

Thereafter, when the user changes the zoom position of the lens unit 10 to the telephoto side, the focal length becomes longer. As a consequence, a light amount drop on the periphery of the image is further reduced (i.e. a light amount on the periphery of the image increases) than when the zoom position of the lens unit 10 is on the wide-angle side, and a state shown in a view (2) of FIG. 3B appears.

However, similarly to the above, a time lag occurs after the zoom position is changed and before a proper correction value is calculated, and hence the same correction value as is used to obtain the image corresponding to the view (1) of FIG. 3A has to be used for an image corresponding to the view (2) of FIG. 3B. As a consequence, an image having a peripheral light amount overcorrected as shown in a view (1) of FIG. 3B is obtained. Thereafter, necessary lens information is acquired to recalculate a correction value, whereby a properly corrected image shown in a view (1) of FIG. 3C is obtained.

Here, in the present embodiment, image quality degraded due to the characteristics of the lens unit 10 is corrected without giving a feeling of wrongness to the user.

Figure 4:
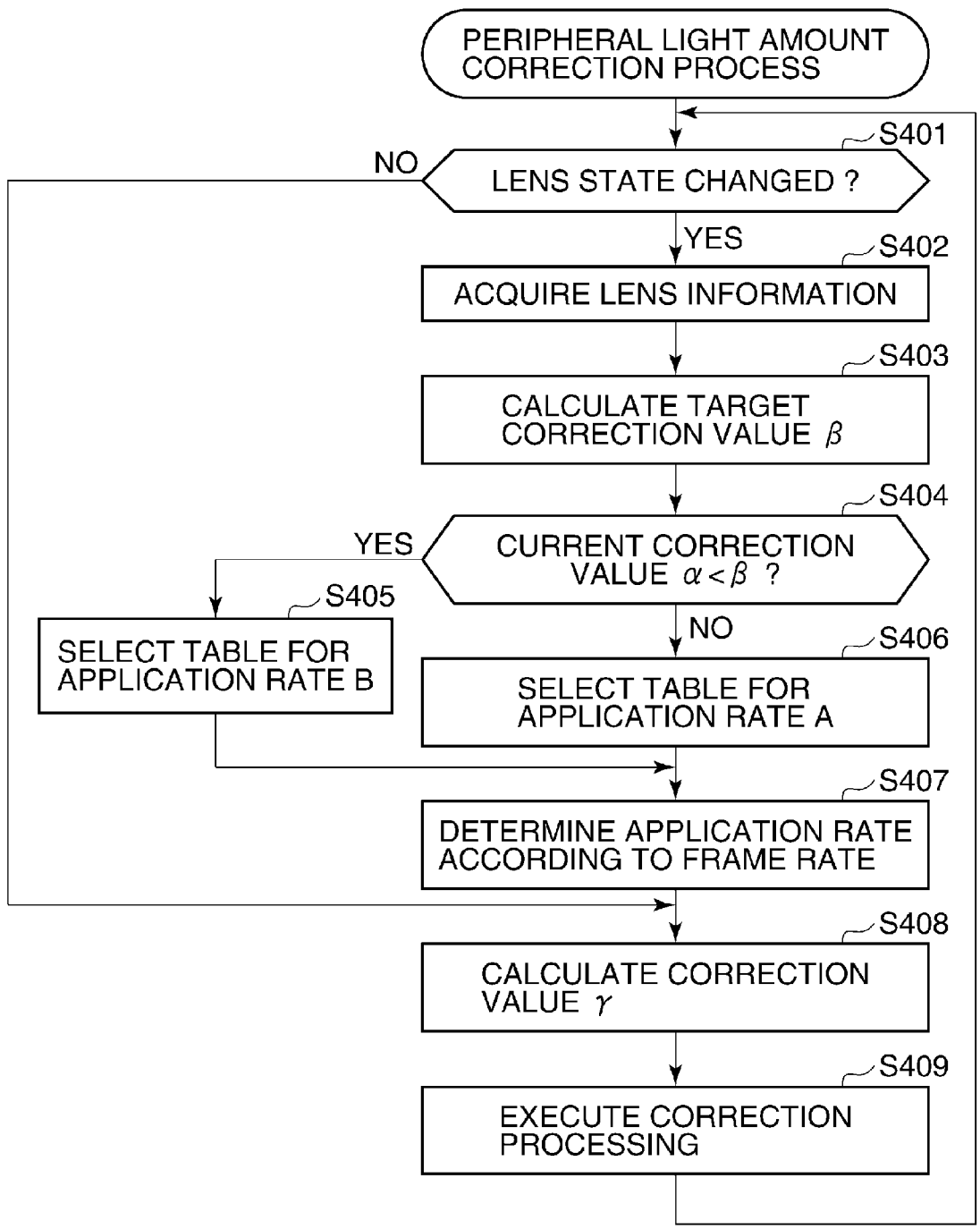
FIG. 4 is a flowchart of a peripheral light amount correction process executed by a system controller of the image pickup apparatus.

FIG. 4 is a flowchart of a peripheral light amount correction process executed by the system controller 50 of the image pickup apparatus 100 of the present embodiment. The peripheral light amount correction process shown in FIG. 4 is executed by the CPU and associated parts of the system controller 50 by loading a program stored in a storage unit, such as the nonvolatile memory 56, into the RAM.

First, in a step S401, during recording of a moving image or display of the same by the LV function, in a state having a peripheral light amount correction applied thereto, the system controller 50 determines whether or not the optical state of the lens unit 10 corresponding to an image of a current frame has been changed from that corresponding to an image of the immediately preceding frame.

In the present step, the system controller 50 performs the determination by determining whether or not the lens status information acquisition section 15 could detect (has detected) a change in the state of the lens unit 10. In this case, a slight time lag from an actual change in the state of the lens unit 10 can be tolerated. If the system controller 50 determines in the step S401 that the state of the lens unit 10 has been changed, the system controller 50 proceeds to a step S402, whereas if not, the system controller 50 proceeds to a step S408.

In the step S402, the system controller 50 acquires lens status information including a changed focal length, a changed aperture value, etc. from the lens status information acquisition section 15, and then proceeds to a step S403.

In the step S403, the system controller 50 causes the correction value-calculating section 23 to calculate a target correction value β based on the lens status information acquired in the step S402 and lens characteristic information read in advance from the lens characteristic information recorder 10d, and then proceeds to a step S404.

In the step S404, the system controller 50 performs a comparison between the target correction value β calculated in the step S403 and the currently set correction value α calculated from an earlier frame than the present frame. If the target correction value β is larger than the correction value α, the system controller 50 proceeds to a step S405, whereas if not, the system controller 50 proceeds to a step S406.

It should be noted that the correction values α and β are not particularly limited insofar as they represent correction values for correcting the peripheral light amount drop. For example, the correction values α and β may be correction gains associated with a certain image height or coefficients for use in calculating a peripheral light amount correction value by a general optical approximate expression.

A case where the target correction value β is larger than the correction value α corresponds to a state where the lens unit 10 has been moved from the telephoto side to the wide-angle side, whereas a case where the target correction value β is not larger than the correction value α corresponds to a state where the lens unit 10 has been moved from the wide-angle side to the telephoto side.

In the step S405, in order to prevent image flickering, the system controller 50 selects a table for an smaller one B of application rates A and B for use in determining a value of the application rate B according to a frame rate of the picked-up moving image, so as to set the application rate B such that the target correction value β is reached later in the peripheral light amount correction than when the application rate A is set. Then, the system controller 50 proceeds to a step S407.

In the step S406, in order to correct overcorrection of the peripheral light amount promptly, the system controller 50 selects a table for the application rate A for use in determining a value of the application rate A according to the frame rate of the picked-up moving image, so as to set the application rate A such that the target correction value β is reached earlier in the peripheral light amount correction than when the application rate B is set, and then proceeds to the step S407. The application rates A and B are not particularly limited insofar as they are indicative of rates at which the correction value is made closer from the current correction value α to the target correction value β (so they indicate the rate at which the correction value is made to approach the target correction value β, starting from the current correction value α).

In the step S407, the system controller 50 determines and sets the application rate A or B by searching the table selected in the step S405 or 5406 according to the frame rate of the picked-up moving image, and then proceeds to the step S408.

Now, the reason for determining the value of the application rate A or B according to the frame rate of the picked-up moving image will be explained. Let it be assumed that each of the current correction value α, the target correction value β, the application rate A, and the application rate B assumes the same value both in a case where the frame rate is 60 fps and in a case where the frame rate is 30 fps. If a correction value γ-calculating method, described hereinafter, is used under the above-mentioned condition, when the frame rate is changed, time required for convergence of the correction value to the target correction value β becomes different. Assuming that six frames are required for convergence of the correction value to the target correction value β, if the frame rate is 60 fps, time required for the convergence becomes equal to (6×1/60) seconds, i.e. 0.1 seconds. On the other hand, when the frame rate is 30 fps, time required for the convergence becomes equal to (6×1/30) seconds, i.e. 0.2 seconds. That is, from the user's viewpoint, the same degree of insufficiency or excess of correction appears to be different, since time taken to correct the insufficient correction or overcorrection is different depending on the frame rate. Therefore, in order not to give a feeling of wrongness to the user, it is required to change the application rates A and B such that the convergence of the correction value to the target correction value β takes the same time irrespective of the frame rate.

In the present embodiment, the nonvolatile memory 56 stores the aforementioned respective tables for the application rates A and B in which values of the application rates A and B are set in association with the respective frame rates in advance, and the system controller 50 selects one of the respective tables for the application rates A and B according to a result of the comparison between the current correction value α and the target correction value β and reads out a value of the application rate A or B from the selected table according to the set frame rate. Alternatively, the nonvolatile memory 56 may store only values of the application rates A and B associated with one of the frame rates. In this case, the system controller 50 calculates application rates A and B based on the stored values thereof according to the set frame rate such that the above-described condition is satisfied. Thus, even when an image is recorded or displayed at a different frame rate, peripheral light amount correction can be performed at the same time intervals by setting one of the application rates A and B determined according to the frame rate as described above, which makes it possible to make the correction time closer to a target time period during which correction is applied.

In the step S408, the system controller 50 calculates a correction value γ ($\gamma_A$ or $\gamma_B$) using the target correction value β, the current correction value α, and the application rate A or B, and then proceeds to a step S409. For example, assuming that the value of the application rate A is equal to 0.8 and the application rate B is equal to 0.6, the correction value $\gamma_A$ for a case where the application rate A is used and the correction value $\gamma_B$ for a case where the application rate B is used are calculated by the following equations (1) and (2), respectively:

$$\gamma_A = (\beta - \alpha) \times 0.8 + \alpha \quad (1)$$

$$\gamma_B = (\beta - \alpha) \times 0.6 + \alpha \quad (2)$$

If the answer to the question of the step S401 is negative (No), the correction value γ is calculated using the target correction value β obtained in the immediately preceding loop, and the correction value α and the application rate A or B applied to the immediately preceding frame, and then proceeds to the step S409.

In the step S409, the system controller 50 updates the correction value α to the correction value γ, and then causes the image processing circuit 20 to correct the peripheral light amount using the updated correction value α, and then returns to the step S401.

As long as the lens status is being changed, the target correction value β is updated in the step S403, on an as-needed basis, by repeatedly executing the peripheral light amount correction process in FIG. 4 on a frame-by-frame basis, so that the update is smoothly performed such that the target correction value β changed according to the lens status is followed with a time lag by the correction value α. Then, when the lens status is stabilized into a steady state, the correction value α becomes closer to the target correction value β in a stepwise manner over a time period corresponding to the application rate A or B.

In the present embodiment, the system controller 50 updates correction values with a time constant (rate of change) such that the current correction value α already set is made closer to the target correction value β, and the application rate representing the time constant is switched according to the manner of change in the optical state of the lens unit 10. Specifically, the system controller 50 sets the time constant to a larger value (i.e. sets the application rate to a smaller value) in a case where the optical state of the lens unit 10 changes such that the degree of peripheral light amount drop increases than in a case where the optical state of the lens unit 10 changes such that the degree of peripheral light amount drop decreases.

As described above, according to the present embodiment, in a case where the target correction value for use in correction of a peripheral light amount drop on an image having its image quality degraded due to the operation of the lens unit 10 changes from a larger value to a smaller value, the correction value is converged to the target correction value quickly, whereby it is possible to obtain a moving image having promptly undergone correction of overcorrection of the peripheral light amount drop. On the other hand, in a case where the target correction value for use in correction of a peripheral light amount drop on an image having its image quality degraded due to the operation of the lens unit 10 changes from a smaller value to a larger value, the correction value is converged to the target correction value α little more slowly, whereby it is possible to obtain a moving image having its image flickering suppressed. This makes it possible to obtain a corrected image which does not give a feeling of wrongness to the user when the optical state of the lens unit 10 has changed.

It should be noted that even in the case of correcting the same moving image, the application rates A and B for defining the magnitude of the time constant may have their values changed according to whether the image pickup apparatus is in a moving image shooting mode for recording or in a live view (LV) mode which is not for recoding. There is a possibility that a moving image stored by moving image shooting is reproduced slowly. Therefore, the application rate may be set to a smaller value (i.e. the time constant is set to a larger value) in the moving image shooting mode than in the LV mode.

Further, as long as the optical state of the lens unit 10 is changing, an object light which enters the image pickup element 14 changes, which makes a peripheral light amount drop inconspicuous. For this reason, the system controller 50 may not update the correction values while the optical state of the lens unit 10 is changing, but update the correction values using the time constant after the optical state of the lens unit 10 has been completely changed (e.g. by determining whether the optical state of the lens unit has stayed constant for a predetermined number of frames). Alternatively, the system controller 50 may update the correction values using a calculated target correction value without using the time constant during changing of the optical state of the lens unit 10, and update the correction values using the time constant after the optical state of the lens unit 10 has been completely changed.

Next, with reference to FIGS. 5 and 6, a description will be given of an image pickup apparatus according to a second embodiment of the present invention. It should be noted that the same or corresponding portions of the above-described first embodiment will be described using the figures and the reference numerals of the first embodiment.

In the present embodiment, the correction of distortion aberration of an image will be explained. As for the peripheral light amount drop, the luminance of the periphery of an image cannot be higher than that of the central portion of the same, except in a special case. Therefore, a peripheral light amount drop on an image is always corrected by increasing the gain of the periphery of the image. On the other hand, as for distortion aberration, there are two types of image quality degradations, i.e. a state of an image being inwardly distorted (so-called barrel distortion) from an ideal state (i.e. a state picked up by an aberration-free lens) and a state of an image being outwardly distorted (pin-cushion distortion) from the ideal state. That is, the optical state of the lens unit 10 can be changed from one of the two states, i.e. the barrel distortion state and the pin-cushion distortion state into the other via the ideal state.

Figure 5:
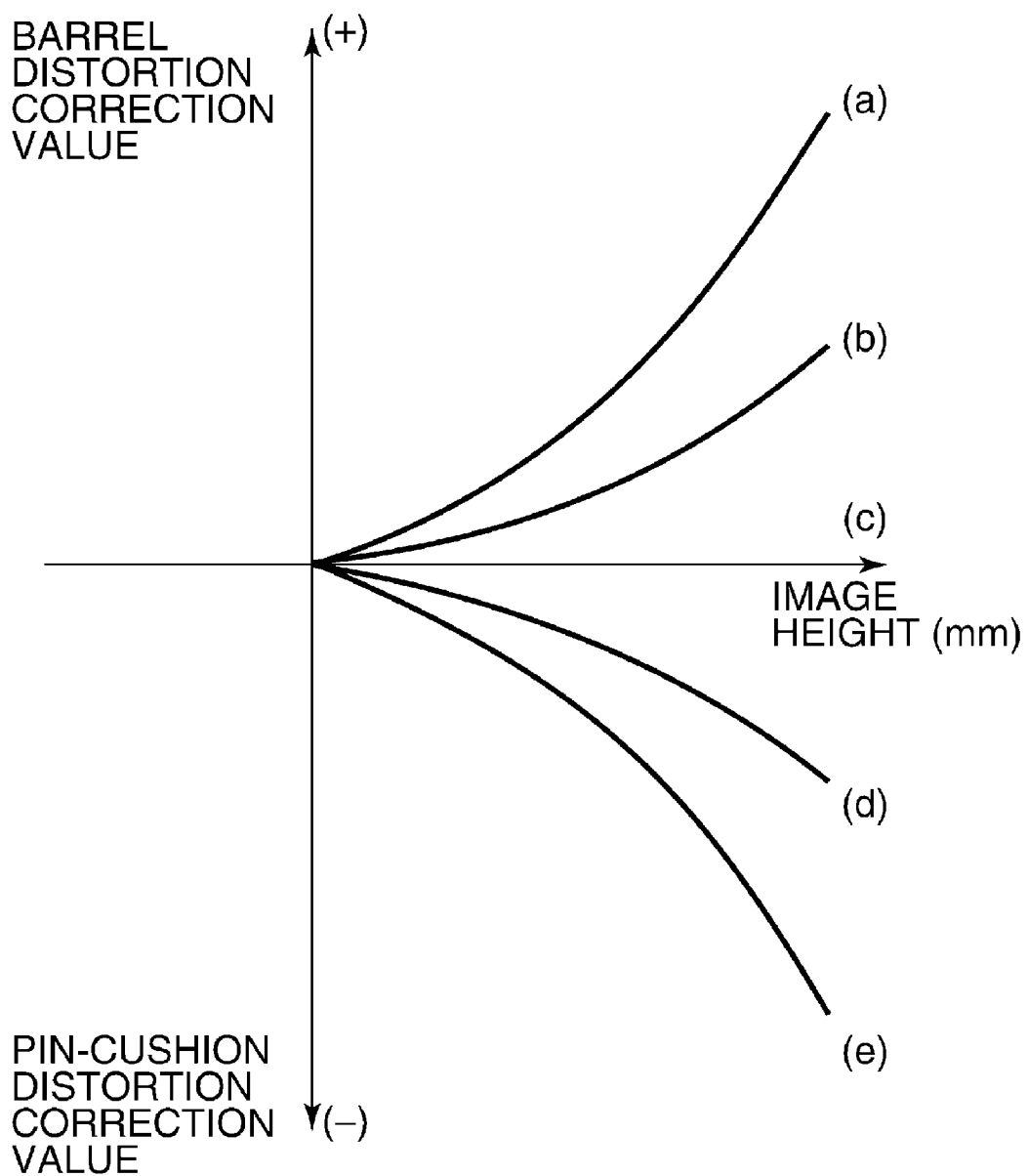
FIG. 5 is a graph showing the relationship between image height and correction values for use in distortion aberration correction in an image pickup apparatus according to a second embodiment of the present invention.

FIG. 5 is a graph showing the relationship between image height and correction values for use in distortion aberration correction. Referring to FIG. 5, the positive direction of the vertical axis represents a correction value for barrel distortion aberration correction, and it is shown that as the value is higher, barrel distortion aberration with a larger distortion amount has occurred. On the other hand, the negative direction of the vertical axis represents a correction value for pin-cushion distortion aberration correction, and it is shown that as the value is lower, pin-cushion distortion aberration with a larger distortion amount has occurred.

Figure 6:
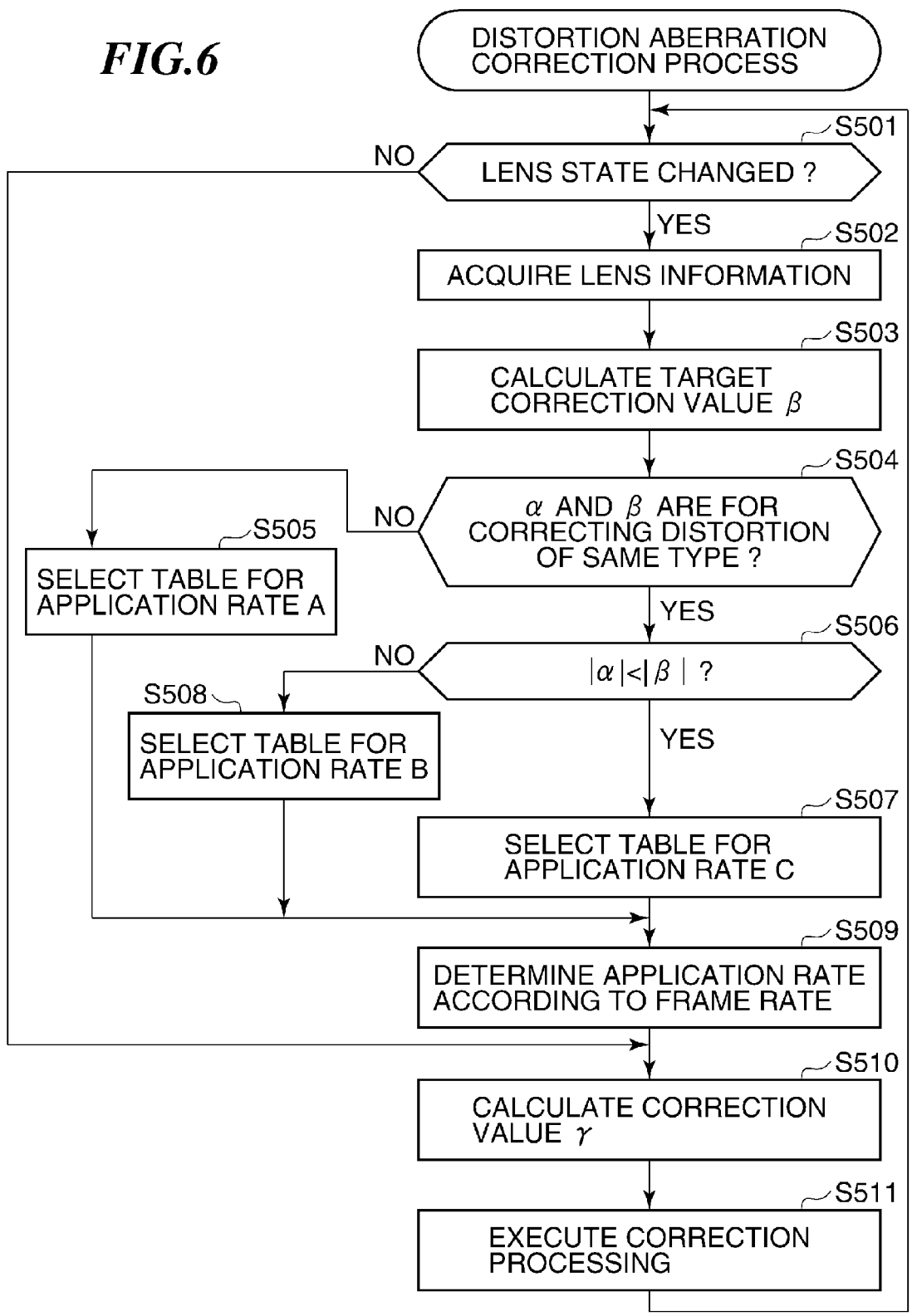
FIG. 6 is a flowchart of a distortion aberration correction process executed by the system controller of the image pickup apparatus.

FIG. 6 is a flowchart of a distortion aberration correction process executed by the system controller 50 of the image pickup apparatus of the present embodiment. The distortion aberration correction process shown in FIG. 6 is executed by the CPU and associated parts of the system controller 50 by loading a program stored in a storage unit, such as the non-volatile memory 56, into the RAM.

In a step S501, the system controller 50 determines whether or not the optical state of the lens unit 10 corresponding to an image of a current frame has been changed from that corresponding to an image of the immediately preceding frame.

In the present step, the system controller 50 determines whether or not the lens status information acquisition section 15 could detect a change in the state of the lens unit 10. In this case, a slight time lag from an actual change in the state of the lens unit 10 can be tolerated. If the system controller 50 determines in the step S501 that the state of the lens unit 10 has been changed, the system controller 50 proceeds to a step S502, whereas if not, the system controller 50 proceeds to a step S510.

In the step S502, the system controller 50 acquires lens status information including a changed focal length, a changed aperture value, etc. from the lens status information acquisition section 15, and then proceeds to a step S503.

In the step S503, the system controller 50 causes the correction value-calculating section 23 to calculate a target correction value $\beta$ based on the lens status information acquired in the step S502 and lens characteristic information read in advance from the lens characteristic information recorder 10d, and then proceeds to a step S504.

The target correction value $\beta$ here is not particularly limited insofar as it can be used as a correction value for use in distortion aberration correction. For example, the target correction value $\beta$ may be a ratio or a difference between an ideal image forming position and an actual image forming position or a coefficient of a general optical approximate expression for use in distortion aberration correction.

In the step S504, the system controller 50 determines whether or not the currently set correction value $\alpha$ calculated for a frame preceding the current frame, and the target correction value $\beta$ calculated in the present loop are for use in correcting the same type of distortion.

Specifically, if the correction value a and the target correction value $\beta$ are both for barrel distortion aberration correction or for pin-cushion distortion aberration correction, the system controller 50 determines that they are correction values for use in correcting the same type of distortion, whereas if not, the system controller 50 determines that they are correction values for use in correcting different types of distortions, respectively. Whether a correction value is for barrel distortion aberration correction or for pin-cushion distortion aberration correction can be determined by the sign of the correction value as shown along the vertical axis in FIG. 5.

If the system controller 50 determines that the correction value $\alpha$ and the target correction value $\beta$ are for correcting the same type of distortion, the system controller 50 proceeds to a step S506, whereas if not, the system controller 50 proceeds to a step S505.

In the step S505, the system controller 50 selects a table for an application rate A which is larger than the other application rates B and C, for use in determining a value of the application rate A according to the frame rate of the picked-up moving image, in order to determine a correction value $\gamma_A$ and thereby update the correction value $\alpha$ to the correction value $\gamma_A$. In other words, the system controller 50 selects a table for setting a time constant (rate of change) such that the target correction value $\beta$ is reached earlier in the distortion aberration correction than when the application rate B or C is set, and then proceeds to a step S509.

In the case where the correction value a and the target correction value $\beta$ are for correcting different types of distortions, correction performed using the correction value $\alpha$ acts to contribute to degradation of image quality. For this reason, it is preferable to make the correction value $\alpha$ closer to the target correction value β as early as possible at least before the correction value α is switched to a correction value for suppressing image degradation.

However, the attempt to make the correction value α closer to the target correction value β as early as possible for an image changed from the barrel distortion state to the pin-cushion distortion state causes a large change in the angle of view after correction, which can make flickering of the moving image conspicuous. In such a case, a method may be employed in which the application rate is changed in two steps such that the correction value α can be gradually made closer to the target correction value β after temporarily passing through a state without correction.

In the following, the method will be described based on an example. For example, when the target correction value β shifts from a value denoted by (a) in FIG. 5 to a value denoted by (e) in FIG. 5, i.e. when the optical state sharply shifts in such a manner as will cause a change of an image from the barrel distortion state to the pin-cushion distortion state, if the correction value (a) in FIG. 5 is changed to the correction value (e) in FIG. 5 in one frame, the angle of view is largely changed. In this case, the image becomes conspicuous in fluctuation of the angle of view.

To solve this problem, until the correction value (a) in FIG. 5 for use in barrel distortion correction has shifted to the correction value (c) in FIG. 5, which assumes a value of 0, an application rate A1 for changing the correction value as early as possible is applied (so A1 is applied between (a) and (c)), and then until the correction value (c) in FIG. 5 has shifted to the correction value (e) in FIG. 5, an application rate A2 for changing the correction value relatively slowly is applied (so A2 is applied between (c) and (e)). This makes it possible to obtain a moving image with little fluctuation of the angle of view without causing overcorrection. In this case, it is only required that the application rate A1 is set to be larger than the application rate A, and the application rate A2 is set to be smaller than the application rate A, and at the same time, time in which the correction value α reaches the target correction value β is set to the same time as taken when the application rate A is set.

If it is determined in the step S504 that the correction value α and the target correction value β are for correcting the same type of distortion, the system controller 50 proceeds to the step S506, wherein the system controller 50 compares between the absolute value of the correction value α and that of the target correction value β. If $|α|<|β|$, the system controller 50 proceeds to a step S507, whereas if $|α|≧|β|$, the system controller 50 proceeds to a step S508.

When it is determined that the target correction value β is not larger than the correction value α, i.e. when the correction value α corresponds e.g. to the value (a) in FIG. 5 and the target correction value β corresponds e.g. to a value denoted by (b) in FIG. 5, if the value (a) in FIG. 5 is applied as the correction value α to an image corresponding to an optical state where the target correction value β assumes the value (b) in FIG. 5, overcorrection occurs. In this case, if barrel distortion has occurred due to the lens unit 10, the corrected image is distorted in a pin-cushion form. Since the image originally distorted in a barrel form is deformed into a state with pin-cushion distortion, the image looks more unnatural than when it was insufficiently corrected. This applies to a case where overcorrection is performed on an image distorted in a pin-cushion form, thereby causing barrel distortion in the image.

To avoid this problem, in the step S508, the system controller 50 selects a table for the application rate B which is smaller than the application rate A, but larger than the application rate C, for use in determining a value of the application rate B according to the frame rate of the picked-up moving image, so as to eliminate overcorrection promptly by causing the correction value to reach the target correction value β earlier than when the application rate C is set. Then, the system controller 50 proceeds to the step S509.

When it is determined that the target correction value β is larger than the correction value α, i.e. when the correction value α corresponds e.g. to the value (b) in FIG. 5 and the target correction value β corresponds e.g. to the value (a) in FIG. 5, if the value (b) in FIG. 5 is applied as the correction value α to an image corresponding to an optical state where the target correction value β assumes the value (a) in FIG. 5, an insufficient correction occurs. In the step S507, the system controller 50 selects a table for the application rate C which is smaller than the application rates A and B, for use in determining a value of the application rate C according to the frame rate of the picked-up moving image, and then proceeds to the step S509. When the table for the application rate C is selected, the correction value reaches the target correction value β later than when the table for the application rate B is selected, which makes it possible to reduce a feeling of wrongness given to the user due to a change in the angle of view.

In the step S509, the system controller 50 determines and sets the application rate A, B or C by searching the table selected in the step S505, S507, or S508 according to the frame rate of the picked-up moving image, and then proceeds to the step S510. Since a value of the application rate A, B or C is determined according to the frame rate of the picked-up moving image, distortion aberration in an image having a different frame rate is corrected at the same time intervals, which makes it possible to make the correction time closer to a target time period during which correction is applied.

In the step S510, the system controller 50 recalculates a correction value γ ($γ_A$, $γ_B$, or $γ_C$) using the target correction value β, the correction value α, and the application rate A, B, or C, and then proceeds to a step S511. It should be noted that the correction values $γ_A$, $γ_B$, or $γ_C$ can be calculated using respective equations similar to the equations (1) and (2) in the first embodiment, in which the difference between the target correction value β and the currently set correction value α is multiplied by the application rate A, B or C reflecting the time constant (rate of change), and the resulting product is added to the currently set correction value α.

If the answer to the question of the step S501 is negative (No), the correction value γ is recalculated using the target correction value β obtained in the immediately preceding loop, and the correction value α and the application rate A, B, or C applied to the immediately preceding frame, and then proceeds to the step S510.

In the step S511, the system controller 50 updates the correction value α to the correction value γ, and then causes the image processing circuit 20 to correct the distortion aberration using the updated correction value α, and then returns to the step S501.

By carrying out the above-described process, it is possible to provide an excellent moving image with fluctuation of the angle of view and overcorrection suppressed, even in the LV mode or in the moving picture recording mode. The other configuration and the advantageous effects are the same as those of the above-described first embodiment.

Distortion aberration includes wave distortion aberration in which an image is distorted inward or outward depending on the height of the image. However, the wave distortion aberration is a combination of barrel distortion aberration and pin-cushion distortion aberration, and therefore, as for an image height to which attention is paid, it is possible to cope with the wave distortion aberration by the same processing as described above.

As for chromatic aberration correction, in general, it is highly likely to be performed as a finer correction than peripheral light amount correction or distortion aberration correction, and hence even if slight overcorrection or fluctuation occurs, there is a high possibility that a user cannot recognize the overcorrection or the fluctuation.

However, an image pickup apparatus having a photographic lens formed on precondition of executing chromatic aberration correction is capable of correcting chromatic aberration by the same processing as described with reference to FIG. 6. In this case, in a RGB Bayer pattern image pickup apparatus, the correction of a pixel signal associated with R or B may be performed by configuring the FIG. 5 graph such that the vertical axis represents the amount and direction of shift from an image forming position of a pixel associated with G.

It should be noted that the present invention is not limited to the above-described embodiments, but it can be practiced in various forms, without departing from the spirit and scope thereof.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

An embodiment of the invention provides an image pickup apparatus capable of forming a corrected image which does not give a feeling of wrongness to a user. In the apparatus, an image pickup element photoelectrically converts an optical image to output the same as image data. A target correction value is calculated for correcting image quality degradation due to a lens unit, based on lens characteristic information and a status of the lens unit. A system controller sets a time constant to stepwise make the current correction value closer to the target correction value, and repeatedly calculates the correction value according to the target correction value and the time constant. The image data is corrected based on the repeatedly calculated correction value. The time constant is changed depending on the relationship between a preceding value of the correction value calculated in the past and the target correction value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-271909 filed Nov. 30, 2009, and Japanese Patent Application No. 2010-259087 filed Nov. 19, 2010, which are hereby incorporated by reference herein in its entirety.

What is claimed is:

1. An image pickup apparatus comprising:
  an image pickup unit configured to photoelectrically convert an optical image of an object, the optical image having passed through an optical member, to thereby output the optical image as image data;
  an acquisition unit configured to acquire a status of the optical member;
  a first calculation unit configured to calculate a first correction value for correcting image quality degradation due to characteristics of the optical member, based on characteristic information on the optical member and the status of the optical member acquired by said acquisition unit;
  a second calculation unit configured to set a rate of change at which a second correction value is made closer to the first correction value, and to repeatedly calculate the second correction value according to the first correction value and the rate of change; and
  a correction unit configured to correct the image data based on the second correction value calculated by said second calculation unit,
  wherein said second calculation unit is configured to set the rate of change in dependence upon a relationship between a preceding value of the second correction value calculated in the past and the first correction value.

2. The image pickup apparatus according to claim 1, wherein said second calculation unit calculates the second correction value by adding a value obtained by multiplying a difference between the first correction value and the preceding value of the second correction value by a coefficient corresponding to the rate of change, to the preceding value of the second correction value.

3. The image pickup apparatus according to claim 1, wherein when the first correction value is larger than the preceding value of the second correction value, the rate of change is set to be larger than when the first correction value is not larger than the preceding value of the second correction value.

4. The image pickup apparatus according to claim 1, wherein the image quality degradation due to characteristics of the optical member is one of image quality degradation due to a peripheral light amount drop, image quality degradation due to distortion aberration, and image quality degradation due to chromatic aberration.

5. The image pickup apparatus according to claim 1, wherein the status of the optical member includes at least one of a zoom position, a focal position, and an aperture value.

6. A method of controlling an image pickup apparatus provided with an image pickup unit configured to photoelectrically convert an optical image of an object, the optical image having passed through an optical member, to thereby output the optical image as image data, comprising:
  acquiring a status of the optical member;
  calculating a first correction value for correcting image quality degradation due to characteristics of the optical member, based on characteristic information on the optical member and the status of the acquired optical member;
  setting a rate of change at which a second correction value is made closer to the first correction value, and repeatedly calculating the second correction value according to the first correction value and the rate of change; and
  correcting the image data based on the second correction value,
  wherein the rate of change is set in dependence upon a relationship between a preceding value of the second correction value calculated in the past and the first correction value.

7. A non-transitory computer-readable nonvolatile storage medium storing a computer-executable program for causing a computer to execute a method of controlling an image pickup apparatus provided with an image pickup unit configured to photoelectrically convert an optical image of an object having passed through an optical member to thereby output the optical image as image data, wherein the method comprises: acquiring a status of the optical member;

calculating a first correction value for correcting image quality degradation due to characteristics of the optical member, based on characteristic information on the optical member and the status of the acquired optical member;

setting a rate of change at which a second correction value is made closer to the first correction value, and repeatedly calculating the second correction value according to the first correction value and the rate of change; and correcting the image data based on the second correction value, wherein the rate of change is set in dependence upon a relationship between a preceding value of the second correction value calculated in the past and the first correction value.

* * * * *